N. F. BURTON.

Gang-Plow.

No. 2,221.

Reissued Apr. 10, 1866.

Witnesses.
Cyrus Yzu
J. H. Sherman

Inventor.
N. F. Burton

N. PETERS, PHOTO-LITHOGRAPHER, WASHINGTON, D. C.

UNITED STATES PATENT OFFICE.

N. F. BURTON, OF GALESBURG, ILLINOIS.

IMPROVEMENT IN GANG-PLOWS.

Specification forming part of Letters Patent No. 33,568, dated October 29, 1861; Reissue No. 2,221, dated April 10, 1863.

*To all whom it may concern:*

Be it known that I, N. F. BURTON, of Galesburg, in the county of Knox and State of Illinois, (formerly of Plymouth, in the county of Hancock and State aforesaid,) have invented a new and Improved Plow; and I do hereby declare that the following is a full, clear, and exact description of the same, reference being had to the annexed drawings, making a part of this specification, in which—

Figure 1:
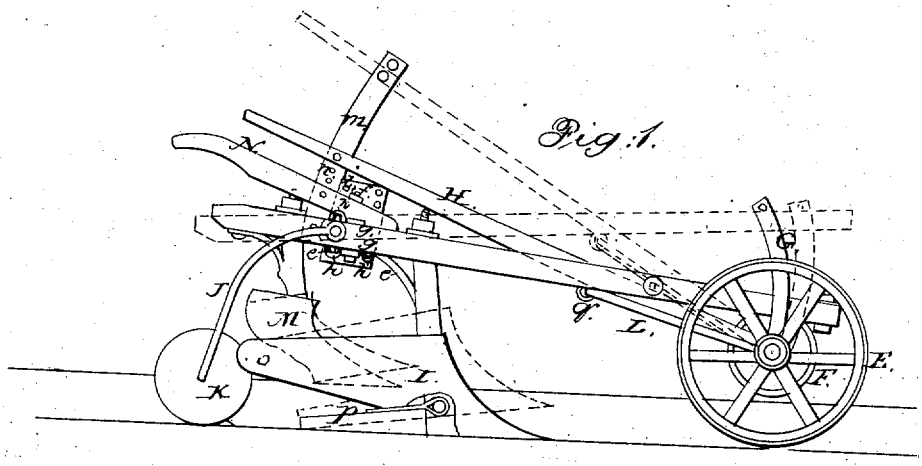
Figure 2:
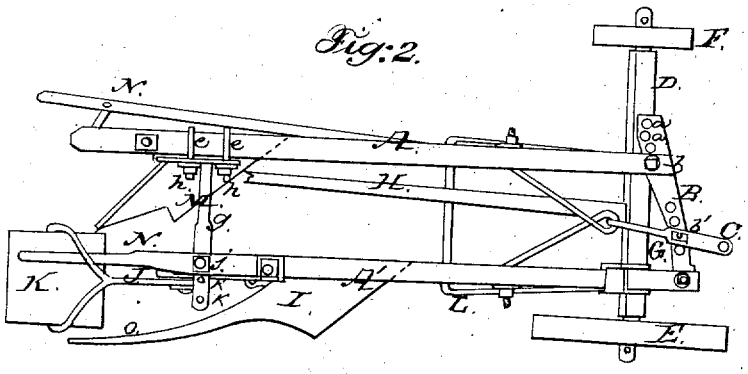

Figure 1 is a side view of my invention, and Fig. 2 is a plan or top view of the same.

Similar letters of reference indicate corresponding parts in the two figures.

This invention relates to a gang-plow designed for surface and subsoil plowing; and it consists in a novel and improved arrangement of parts, substantially as hereinafter shown and described, whereby the depth of the furrows may be regulated as desired and the soil and subsoil thoroughly plowed or broken up and left in a favorable state for the cultivation of crops.

To enable those skilled in the art to understand and construct my invention, I will proceed to describe it.

A A′ represent two plow-beams, the front ends of which are connected by a metal plate, B, perforated with holes A, through any one of which and the beam A a screw-bolt, *b*, passes. *b′* is a bolt, which secures a draft-bar, C, to the plate B at varying points, according to the direction of the line of draft desired. The back parts of the beams A A′ are connected by clamps *e e*, a plate, *f*, and two bars, *g g*, the latter being secured at one end to the plate *f*—one over the other. The clamps *e e* are simply staples, which embrace the beam A, and are secured in the plate *f* by nuts *h*. The staples pass through any of a series of holes, *i*, in the plate *f*, arranged in vertical rows. (See Fig. 1.) The beam A′ is secured between the bars *g g* by screw-bolt *j*, (see Fig. 2,) which passes through any of a series of holes, *k*, in the bars *g g* and admits of the back parts of the beams A A′ being secured at a greater or less distance apart, as may be desired. The front ends of the beams A A′ may be secured at a greater or less distance apart by adjusting the bolt *b* in any of the holes *a* in plate B.

D is an axle having at one end a large wheel, E, and a small wheel, F, at the opposite end. This axle D has a curved or segmental guide, G, attached, through which the beam A′ passes, and is allowed to slide freely therein. The axle D has an arm, H, attached, which extends back between the beams A A′ and has a loop or staple connected to it, said loop being fitted on a curved bar, *m*, attached to beam A, the arm H being secured at any desired height by means of a pin, *n*, passing through bar *m*. The axle D is connected to the beams A A′ by means of a bail-shaped rod, L, the back end of which is attached to the under sides of the beams A A′ by staples or eyes *q*, and the arm H is fitted on the back part of the rod L by means of an eye or staple.

The beam A has a surface-plow, M, attached to its back part. To the beam A′ there is secured a subsoil-plow, I. This plow is in advance of the surface-plow M, and has a landside, *p*, and also a long-winged mold-board, *o*, extending back past the surface-plow M. The depth of penetration of both plows may be graduated and the front ends of the beams thrown up so that the plows will run out of the ground, by adjusting the arm H, and the surface-plow M may have the depth of its penetration graduated independently or separately by securing the clamps or staples *e e* higher or lower in the plate *f*. The plow I, following in the furrow formerly made by the plow M, throws up the subsoil to the surface, and the long wing of its mold-board prevents said subsoil from falling back into its trench, while the plow M throws the surface-soil into said trench. The large wheel E runs directly before the plow I in the furrow formerly made by the plow M, while the small wheel F runs on the unplowed surface. By shifting the draft-bar laterally more or less land may be given the plows, as desired. A handle, N, is attached to the back part of the beam A.

I claim as new and desire to secure by Letters Patent—

1. The device for adjusting the beams A A′ by means of plate *f* and clamps *e e* and bars *g g*, substantially as set forth, whereby the depth of penetration of the plows M and I may be changed at pleasure.

2. The combination of the subsoil-plow I, having a long-winged mold-board, with the surface-plow M, arranged substantially as and for the purpose set forth.

3. The attaching of the axle D to the beams A A′ through the medium of the bail-shaped rod L, in combination with the arm H, attached to the axle D, and having its bearing or fulcrum on the rod L, as herein described, whereby the depth of the penetration of both plows may be regulated at pleasure and they may also be made to run out of the ground when desired.

N. F. BURTON.

Witnesses:
CYRUS TRUE,
J. H. SHERMAN.